US008482407B2

(12) United States Patent
Schmehl et al.

(10) Patent No.: US 8,482,407 B2
(45) Date of Patent: *Jul. 9, 2013

(54) SYSTEM AND METHOD FOR TRACKING A CONTROLLER

(75) Inventors: Ian C. Schmehl, San Antonio, TX (US); Scott White, Austin, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/595,702

(22) Filed: Aug. 27, 2012

(65) Prior Publication Data

US 2012/0320272 A1    Dec. 20, 2012

Related U.S. Application Data

(63) Continuation of application No. 12/411,150, filed on Mar. 25, 2009, now Pat. No. 8,274,381.

(51) Int. Cl.
G08B 1/08    (2006.01)

(52) U.S. Cl.
USPC .................. 340/539.13; 340/7.21; 340/870.01

(58) Field of Classification Search
USPC ................ 340/539.13, 6.1, 7.2, 7.21, 870.01, 340/870.02, 539.19, 539.21, 539.23, 539.17
See application file for complete search history.

(56) References Cited

U.S. PATENT DOCUMENTS

| 5,204,657 | A | | 4/1993 | Prosser |
|---|---|---|---|---|
| 5,706,211 | A | * | 1/1998 | Beletic et al. ................. 709/206 |
| 5,748,104 | A | * | 5/1998 | Argyroudis et al. ..... 340/870.11 |
| 5,793,413 | A | * | 8/1998 | Hylton et al. ................... 725/81 |
| 6,522,253 | B1 | | 2/2003 | Saltus |
| 7,002,473 | B2 | | 2/2006 | Glick |
| 7,116,229 | B1 | | 10/2006 | Miramontes |
| 7,486,188 | B2 | | 2/2009 | Van Alstyne |
| 7,492,262 | B2 | | 2/2009 | Washington |
| 7,817,035 | B2 | * | 10/2010 | Hardacker et al. ......... 340/568.1 |
| 8,031,270 | B1 | * | 10/2011 | Wisniewski et al. .......... 348/734 |
| 2006/0087433 | A1 | * | 4/2006 | Sheller ....................... 340/572.1 |
| 2006/0197676 | A1 | | 9/2006 | Smith |
| 2008/0278635 | A1 | | 11/2008 | Hardacker |

* cited by examiner

Primary Examiner — Daniel Previl
(74) Attorney, Agent, or Firm — Guntin & Gust, PLC; Douglas Schnabel

(57) ABSTRACT

A system that incorporates teachings of the present disclosure may include, for example, a gateway comprising a controller to transmit a first RF signal to a remote control device, wherein the first radio-frequency signal is received by a radio-frequency identification (RFID) tag associated with the remote control device, receive at each of a plurality of receivers operably coupled to the gateway a second RF signal from the RFID tag of the remote control device in response to the first RF signal, determine an approximate location of the remote control device based on at least a portion of the second RF signals received by the plurality of receivers, and transmit a signal to a set-top-box, wherein the signal comprises the approximate location of the remote control device, and wherein the set-top-box displays the approximate location of the remote control device. Other embodiments are disclosed.

20 Claims, 7 Drawing Sheets

100

700

SYSTEM AND METHOD FOR TRACKING A CONTROLLER

CROSS-REFERENCE TO RELATED APPLICATIONS

This application is a continuation of and claims priority to U.S. patent application Ser. No. 12/411,150 filed Mar. 25, 2009, which is incorporated herein by reference in its entirety.

FIELD OF THE DISCLOSURE

The present disclosure relates generally to object tracking and more specifically to a system and method for tracking a controller.

BACKGROUND

Currently, people often enjoy media content by using devices such as televisions or other devices enabled to receive and display television content. People using such devices typically use a remote control or other similar device to change channels, adjust volume, record media content, interact with the media content, and/or perform a myriad of other functions. Remote controls, however, are frequently misplaced or lost. Searching for a misplaced or lost remote control can often be a frustrating endeavor for those trying to watch a television program or trying to enjoy other media content.

DETAILED DESCRIPTION

Figure 1:
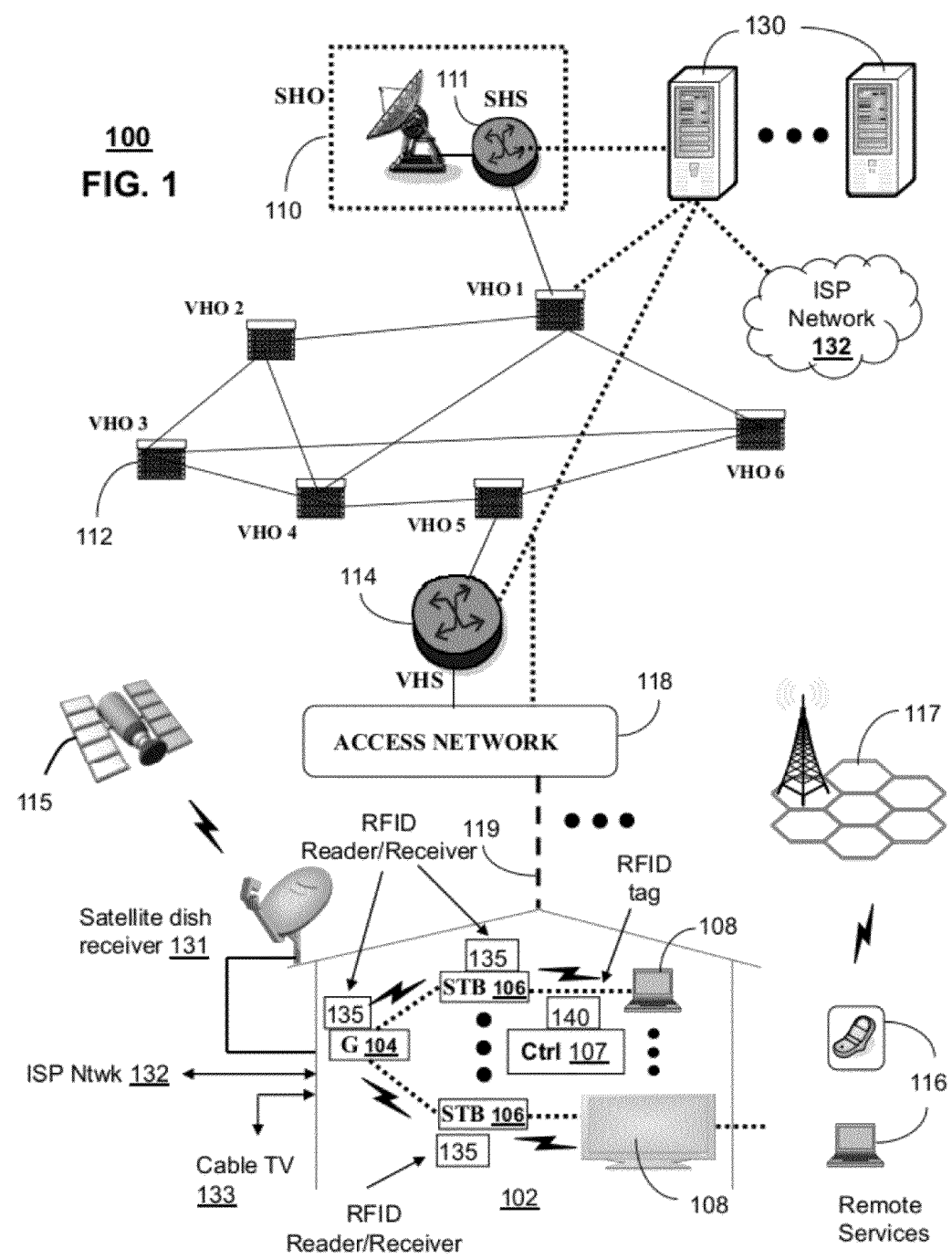
FIGS. 1-2 depict illustrative embodiments of communication systems that provide media services.

One embodiment of the present disclosure can entail a method including transmitting a first radio-frequency (RF) signal to a remote control device by utilizing at least one of a gateway and a set-top-box (STB), wherein the gateway and the STB are operably coupled to the remote control device, receiving at each of a plurality of receivers operably coupled to at least one of the gateway and the STB a second RF signal from the remote control device in response to the first RF signal, determining an approximate location of the remote control device based on one or more instances of the second RF signal received by the plurality of receivers, wherein the determining step is performed by at least one of the gateway and the STB, and displaying the determined location of the remote control device by utilizing the STB, wherein the determined location is displayed via a graphical user interface Another embodiment of the present disclosure can entail a gateway comprising a controller to transmit a first RF signal to a remote control device, wherein the first radio-frequency signal is received by a radio-frequency identification (RFID) tag associated with the remote control device, receive at each of a plurality of receivers operably coupled to the gateway a second RF signal from the RFID tag of the remote control device in response to the first RF signal, determine an approximate location of the remote control device based on at least a portion of the second RF signals received by the plurality of receivers, and transmit a signal to a set-top-box, wherein the signal comprises the approximate location of the remote control device, and wherein the set-top-box displays the approximate location of the remote control device.

Yet another embodiment of the present disclosure can entail a STB comprising a controller to receive a RF signal from a RFID tag associated with a remote control device, determine a location of the remote control device based on the received RF signal, and display the location of the remote control device via a graphical user interface.

Yet another embodiment of the present disclosure can entail a remote control comprising a controller to receive a first RF signal from a gateway, and transmit a second RF signal to a plurality of receivers operably coupled to the gateway, wherein the gateway determines a location of the remote control device based on one or more instances the second RF signal received by the plurality of receivers, and wherein the gateway transmits the determined location to a STB operably coupled to the gateway, and wherein the STB displays the determined location via a graphical user interface.

Yet another embodiment of the present disclosure can entail a computer-readable storage medium comprising computer instructions to transmit a first RF signal to a remote control device, receive a second RF signal from the remote control device in response to the first RF signal, determine a location of the remote control device based on the second RF signal, and display in a graphical user interface the determined location of the remote control device.

Yet another embodiment of the present disclosure can entail a method including presenting on a media device a graphical user interface indicating a location of a remote control device.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

In an embodiment, the communication system 100 can also include a plurality of radio-frequency identification (RFID) readers and/or receivers 135. The readers 135 can be operably coupled to the gateway 104 and the STBs 106 The system 100 can also include at least one RFID tag 140, which can be associated with and/or operably coupled to the media controller 107. The RFID tag 140 can be an active tag, a passive tag, or a semi-passive tag. The readers 135 can be configured to transmit RF signals to any RFID tag 140 in range of the readers 135.

In the case of a passive RFID tag 140, the transmitted signals can be utilized by the RFID tag 140 to energize RFID circuits in the tag. Once powered, the passive RFID tag 140 can transmit a RF signal to the readers 135 in response to the signal transmitted by the readers 135. If the RFID tag 140 is a semi-passive tag, then the tag can transmit a signal in response to the signal transmitted by the readers 135 without having to draw power from the signal transmitted by the readers 135. In the case of an active tag, the active tag can broadcast its own signal to the readers 135 without having to first receive a signal from the readers 135 to initiate a signal transmission.

Another distinct portion of the computing devices 130 can function as a server (herein referred to as server 130). The server 130 can use common computing and communication technology to perform the function of relaying and/or receiving media content to ISP network 132 or to other networks.

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

It follows from the above illustrations that the present disclosure can apply to any present or future interactive over-the-air or landline media content services.

Figure 2:
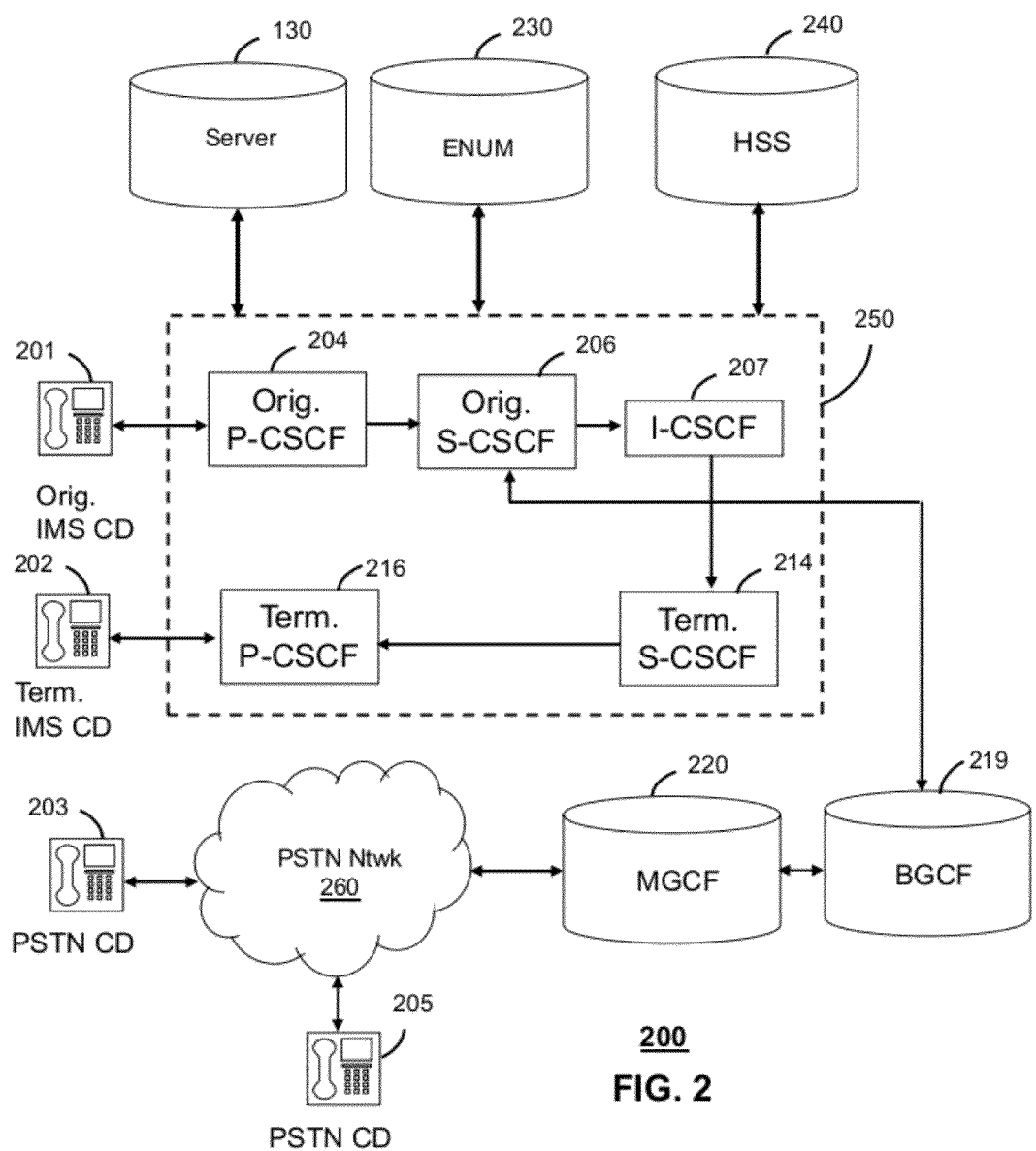

FIG. 2 depicts an illustrative embodiment of a communication system 200 employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS compliant communication devices (CD) 201, 202, Public Switched Telephone Network (PSTN) CDs 203, 205, and combinations thereof by way of a Media Gateway Control Function (MGCF) 220 coupled to a PSTN network 260.

IMS CDs 201, 202 can register with the IMS network 250 by contacting a Proxy Call Session Control Function (P-CSCF) which communicates with a corresponding Serving CSCF (S-CSCF) to register the CDs with at the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit queries to the ENUM system 230 to translate an E.164 telephone number in the SIP INVITE to a SIP Uniform Resource Identifier (URI) if the terminating communication device is IMS compliant.

The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214. The terminating S-CSCF 214 can then identify a terminating P-CSCF 216 associated with the terminating CD 202. The P-CSCF 216 then signals the CD 202 to establish communications.

If the terminating communication device is instead a PSTN CD such as references 203 or 205, the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD by common means over the PSTN network 260.

The aforementioned communication process is symmetrical. Accordingly, the terms "originating" and "terminating" in FIG. 2 are interchangeable. It is further noted that communication system 200 can be adapted to support video conferencing by way of common protocols such as H.323. In addition, communication system 200 can be adapted to provide the IMS CDs 201, 203 the multimedia and Internet services of communication system 100.

The server 130 of FIG. 1 can be operably coupled to the second communication system 200 for purposes similar to those described above.

Figure 3:
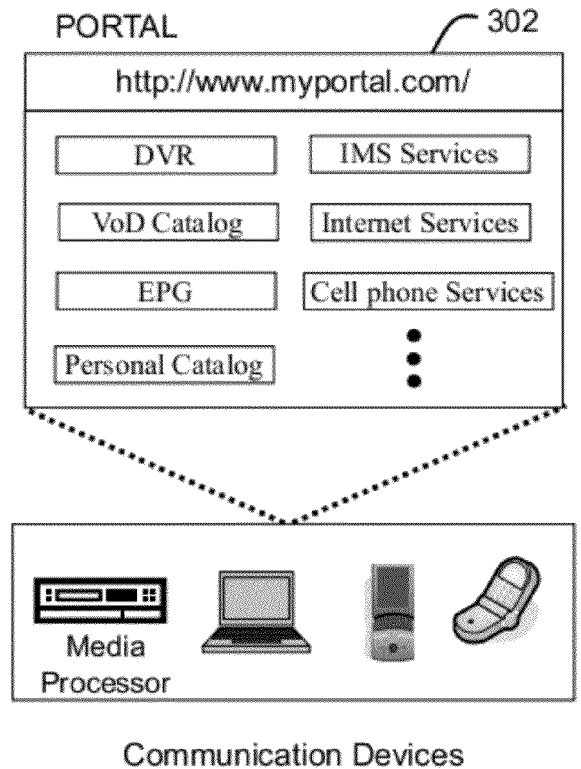
FIG. 3 depicts an illustrative embodiment of a portal interacting with the communication systems of FIGS. 1-2.

FIG. 3 depicts an illustrative embodiment of a portal 302 which can operate from the computing devices 130 described earlier of communication 100 illustrated in FIG. 1. The portal 302 can be used for managing services of communication systems 100-200. The portal 302 can be accessed by a Uniform Resource Locator (URL) with a common Internet browser such as Microsoft's Internet Explorer™ using an Internet-capable communication device such as those described for FIGS. 1-2. The portal 302 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services described earlier, provisioning Internet services, provisioning cellular phone services, and so on.

Figure 4:
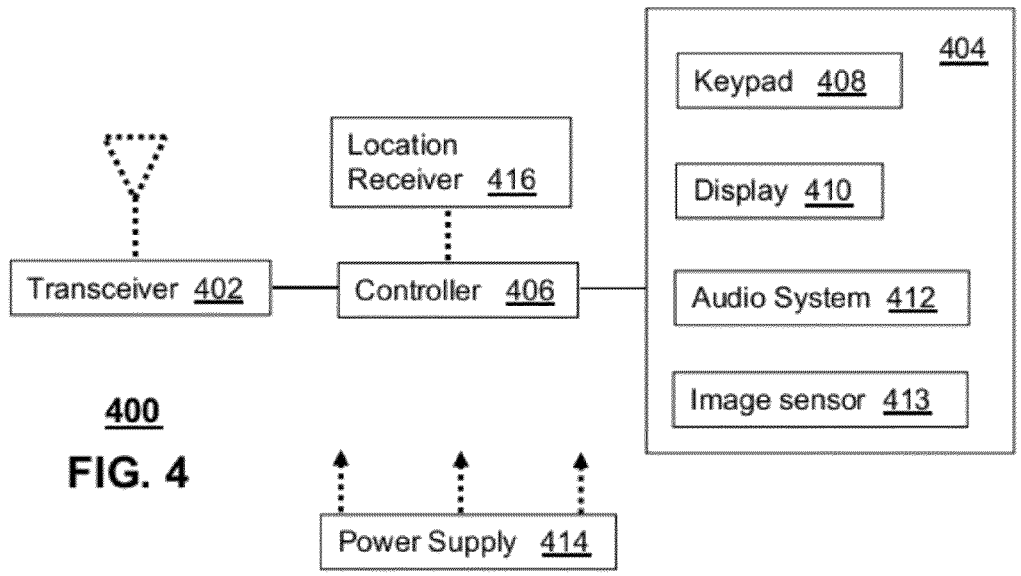
FIG. 4 depicts an illustrative embodiment of a communication device utilized in the communication systems of FIGS. 1-2.

FIG. 4 depicts an exemplary embodiment of a communication device 400. Communication device 400 can serve in whole or in part as an illustrative embodiment of the communication devices of FIGS. 1-2. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, and next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, joystick, mouse, or navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric dialing keypad commonly used by phones, and/or a Qwerty keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver for identifying a location of the communication device 400 based on signals generated by a constellation of GPS satellites, thereby facilitating common location services such as navigation.

The communication device 400 can use the transceiver 402 to also determine a proximity to a cellular, WiFi or Bluetooth access point by common power sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such a Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

Figure 5:
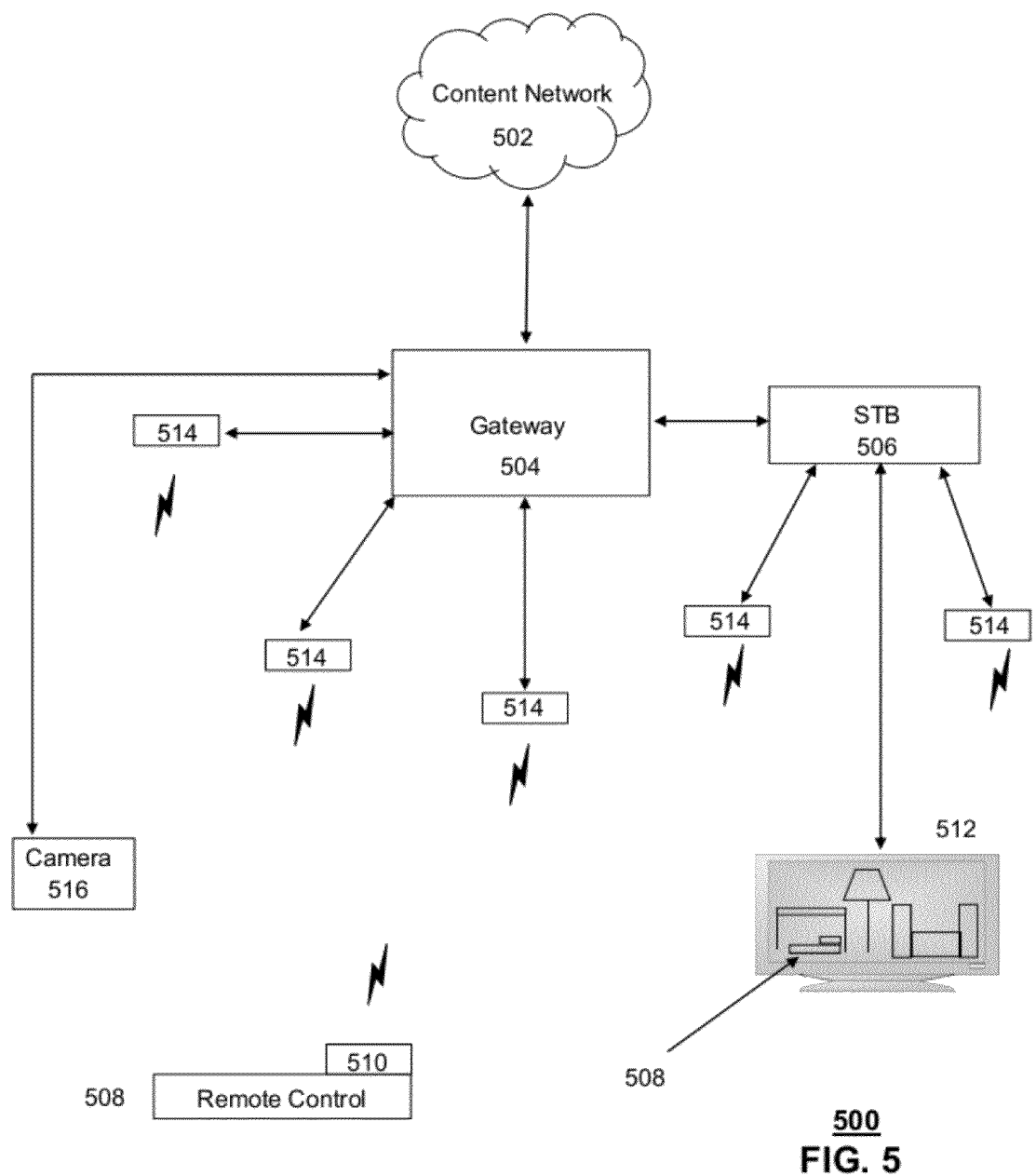
FIG. 5 depicts an illustrative embodiment of a system for tracking a controller, the system operating in portions of the communication systems of FIGS. 1-2.

FIG. 5 depicts an illustrative embodiment of a system 500 for tracking a controller, the system 500 being operable in portions of the communications systems of FIGS. 1-2. The system 500 can include a content network 502, which can be configured to provide iTV services and media content. The media content can include video, audio, still images, text, other media content, and/or combinations thereof. Notably, the iTV services and media content provided by the content network 502 can include IPTV, interactive cable television, and/or interactive satellite television.

The content network 502 can be operably coupled to a gateway 504 and can deliver the media content to the gateway 504, which can serve as an interface between the content network 502 and the other components/devices of the system 500. The gateway 504 can relay the media content to STB 506, which can have an associated remote control 508. Notably, the remote control 508 can be utilized to switch channels, adjust volume, record media content, interact with media content, and/or perform other functions. The remote control 508 can include an RFID tag 510, which can be similar to RFID tag 140 and can contain information about the remote control 508 and/or any other desired information. Much like RFID tag 140, RFID tag 510 can be an active tag, a passive tag, or a semi-passive tag.

Once STB 506 receives the media content, the STB 506 can transmit the media content to the display device 512, which can output and/or display the media content to a user. The display device 512 can be a television, cellular phone, computer, personal digital assistant (PDA), or other device capable of displaying media content. The system 500 can also include a plurality of receivers 514, which can be operably coupled to gateway 504 and STB 506 and can be transceivers, RFID readers, and other similar devices. When the receivers 514 are RFID readers, the RFID readers can be configured to transmit RF signals, which can be received by any RFID tag 510 in the range of the RF signals.

If the RFID tag 510 is a passive tag, the RF signals transmitted by the RFID reader can be utilized to power RFID circuitry in the RFID tag 510, and the RFID tag 510 can transmit a response RF signal back to the RFID reader. When the RFID tag 510 is an active or semi-passive tag, the tag 510 does not need to utilize the signal from the RFID reader to power RFID circuitry in the tag 510, and the tag 510 can simply transmit a response RF signal back to the RFID reader. The RFID reader, STB, and/or the gateway 504 can utilize any RF signals received from the RFID tag 510 of the remote control 508 to determine an approximate location of the remote control 508. The system 500 can also include at least one camera 516, which can take a recording of an area associated with the devices/components in the system 500.

Figure 6:
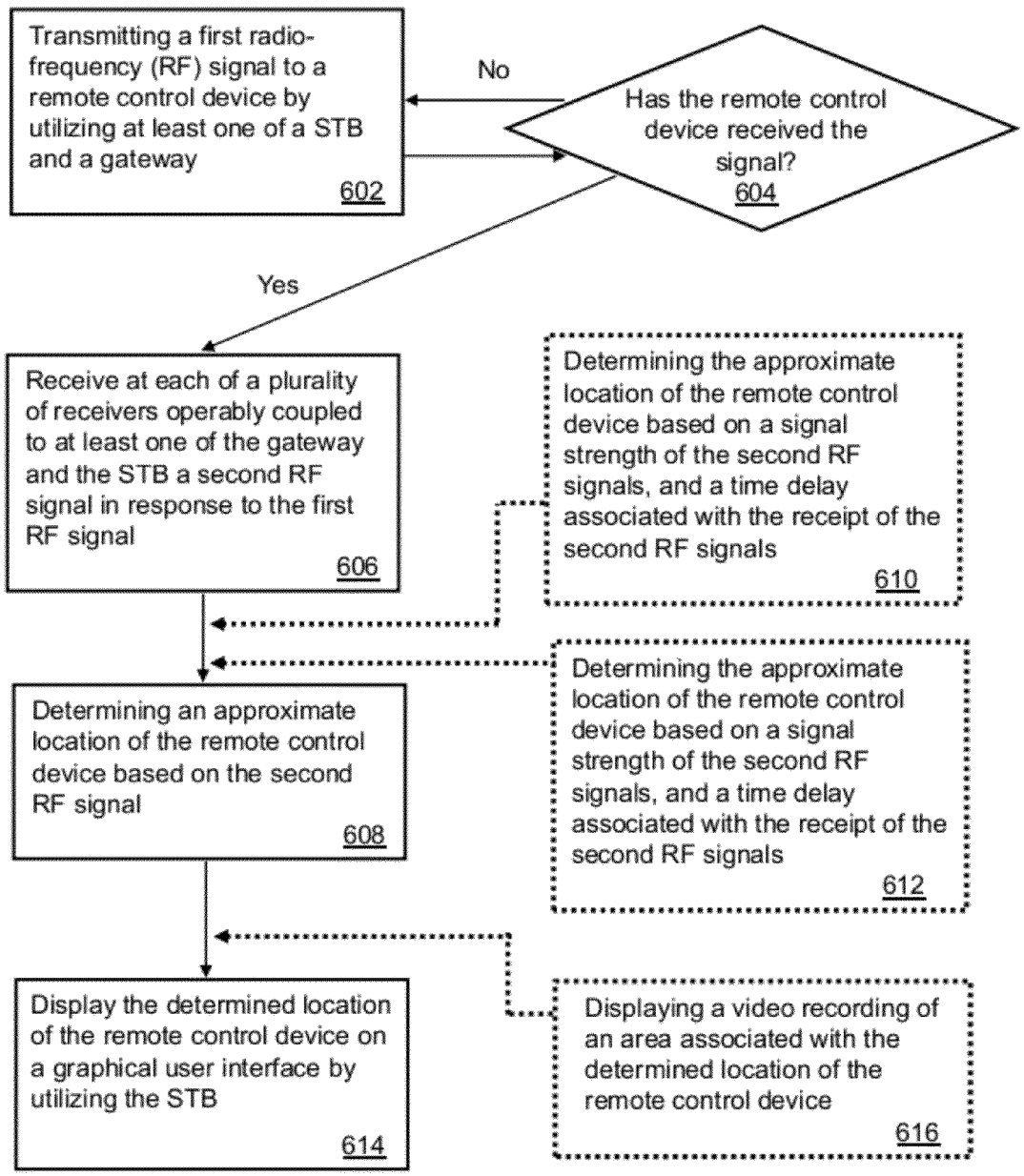
FIG. 6 depicts an illustrative embodiment of a method operating in portions of the communications systems of FIGS. 1-2 and the system of FIG. 5.

FIG. 6 depicts an illustrative method 600 that operates in portions of the communication systems of FIGS. 1-2 and the system of FIG. 5. Method 600 can begin with step 602 in which at least one of the gateway 504 and the STB 506 can transmit a RF signal to remote control device 508. The gateway 504 and/or STB 506 can utilize the receivers 514, which can be RFID readers, to transmit the RF signal. Notably, the receivers 514 can be positioned in an area where the remote control 508 is expected to be located. For example, if a television is in a living room and the remote control is normally in the living room, then the receivers 514 can be placed in the living room. A user trying to find a misplaced or lost remote control 508 can initiate the transmission of the RF signal to the remote control device 508 by selecting a button on the gateway 504 and/or STB 506, selecting an option in an EPG displayed on the display device 512, or by initiating the transmission through other means. Of course, the user does not have to manually initiate the transmission, but instead can rely on the gateway 504, STB 506, and/or the receivers 514 to automatically send out the RF signal based on user preferences or otherwise.

The method 600 can also include determining whether the remote control 508 received the RF signal at step 604. If the remote control 508 does not receive the signal, the RF signal can be re-transmitted by at least one of the gateway 504, STB 506, and/or the receivers 514. When the remote control 508 is in the vicinity of the RF signal and receives the RF signal, each of the plurality of receivers 514 can be configured to receive a response RF signal transmitted by the RFID tag 510 of the remote control 508 in response to the RF signal at step 606. Once the response RF signals are received by the plurality of receivers 514, the gateway 504 and/or the STB 506 can determine an approximate location of the remote control 508 based on at least a portion of the one or more instances of the response signal sent by the RFID tag 510 at step 608.

In an embodiment, the gateway 504 and/or the STB 506 can determine, at step 610, the approximate location of the remote control 508 based on one or more of a signal strength of the response RF signals received by each of the plurality of receivers 514, and a time delay associated with the receipt of the response RF signals by the plurality of receivers 514. In another embodiment, the gateway 504 and/or the STB 506 can determine the approximate location of the remote control 508 according to a triangulation analysis of the response RF signals received by the plurality of receivers 514 at step 612. The location of the remote control 508 can also be determined based on the angle of arrival of the response RF signals and/or other location methods.

After the gateway 504 and/or the STB 506 determines the location of the remote control 508, the method 600 can include, at step 614, displaying the determined location of the remote control 508 to the user via display device 512. Notably, the location can be displayed on a graphical user interface displayed by device 512. In an embodiment, the location can be shown on a map of an area associated with the determined location of the remote control 508. For example, if the remote control is found to be in the living room of the user, a blueprint or image of the room can be displayed on a display device 512. The blueprint or image can indicate where the remote control 508 is, such as by highlighting or marking a region in the image, so that the user can easily find the remote control 508. In another embodiment, the method 600 can include displaying the determined location of the remote control 508 via an EPG and/or interactive program. Numerical measurements relative to a reference point in a map of an area associated with the determined location can be provided to the user via the EPG to illustrate to the user where the remote control 508 is. For example, if a scaled blueprint is utilized, the display device 512 can show that the remote control 508 is approximately ten feet from a particular corner of the map.

Figure 7:
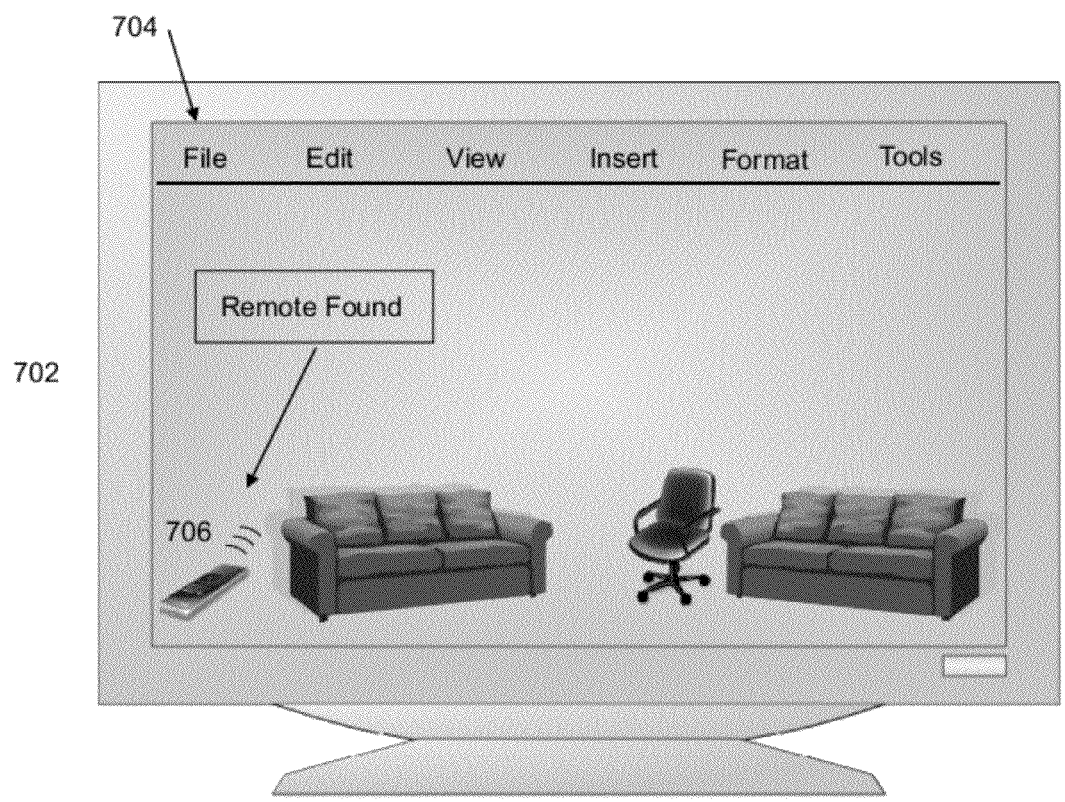
FIG. 7 depicts an illustrative embodiment of a graphical user interface indicating a location of a remote control device.

FIG. 7 depicts an illustrative embodiment of a graphical user interface (GUI) indicating a location of a remote control device. The GUI can be displayed on a media device 702, which can be a television, a computer, a cellular device, or other device capable of displaying a GUI. In FIG. 7, the GUI shows that the remote control device 706 is near the user's sofa. The user can utilize the GUI's menu 704, which can include a series of commands that the user can use to interact with the GUI. For example, a user can utilize a command in the "View" menu to zoom in on the location of the remote control device 706. Additionally, the user can set preferences related to the display of the remote control 706. As an example, the user can set a preference to have the GUI automatically highlight and/or mark the location of the remote control when the location is determined. The user can choose to view the location of the remote control device 706 in blueprint mode, a camera mode, or any other mode for viewing the location of the remote 706. The GUI can also be part of an EPG or on-demand service.

Upon reviewing the aforementioned embodiments, it would be evident to an artisan with ordinary skill in the art that said embodiments can be modified, reduced, or enhanced without departing from the scope and spirit of the claims described below. For example, the method 600 can include, at step 616, displaying a video recording of an area associated with the determined location of the remote control 508. The video recording can be taken by camera 516, which can be operably coupled to the gateway 504 and/or the STB 506. The user can view the video recording on the display device 512 and the approximate location of the remote control 508 can be marked, highlighted, or otherwise indicated on the video recording to direct the user to the remote control 508. As an illustration, if the remote control is found to be in the user's kitchen by the system 500, a video of the kitchen can appear on display device 512. The region of the video recording of the kitchen where the remote control 508 is determined to be at can be circled or flagged to aid the user in finding the remote control 508.

In another embodiment, when the receiver 514 sends the RF signal to the remote control 508 and the remote control 508 receives the RF signal, an audio signal can be generated at the remote control 508 to alert the user to its whereabouts. For example, if the remote control 508 is in range of the RF signal and the remote control 508 receives the signal, the remote control 508 can make a beeping sound or other sound so that the user can easily find it.

In yet another embodiment, if the RFID tag 510 of the remote control 508 is an active RFID tag, the remote control 508 does not have to first receive the RF signal from the gateway 504, STB 506, and/or receivers 514 prior to sending a RF signal to the gateway 504, STB 506, and/or the receivers 514. Since an active RFID tag has its own battery supply, it can transmit its own signals without first receiving a RF signal by another device of the system 500.

Other suitable modifications can be applied to the present disclosure without departing from the scope of the claims below. Accordingly, the reader is directed to the claims section for a fuller understanding of the breadth and scope of the present disclosure.

Figure 8:
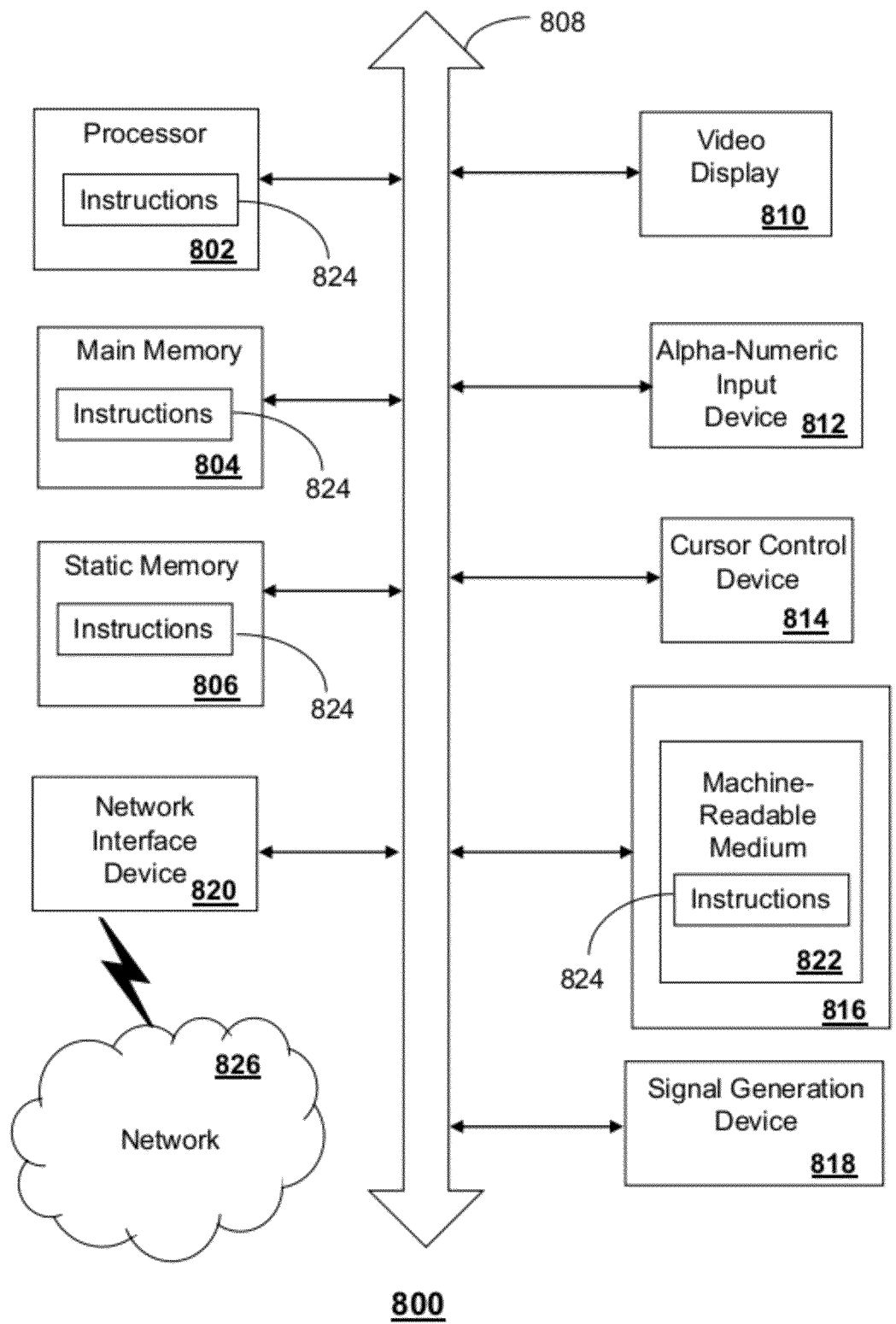
FIG. 8 is a diagrammatic representation of a machine in the form of a computer system within which a set of instructions, when executed, may cause the machine to perform any one or more of the methodologies discussed herein.

FIG. 8 depicts an exemplary diagrammatic representation of a machine in the form of a computer system 800 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 800 may include a processor 802 (e.g., a central processing unit (CPU), a graphics processing unit (GPU), or both), a main memory 804 and a static memory 806, which communicate with each other via a bus 808. The computer system 800 may further include a video display unit 810 (e.g., a liquid crystal display (LCD), a flat panel, a solid state display, or a cathode ray tube (CRT)). The computer system 800 may include an input device 812 (e.g., a keyboard), a cursor control device 814 (e.g., a mouse), a disk drive unit 816, a signal generation device 818 (e.g., a speaker or remote control) and a network interface device 820.

The disk drive unit 816 may include a machine-readable medium 822 on which is stored one or more sets of instructions (e.g., software 824) embodying any one or more of the methodologies or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 824, or that which receives and executes instructions 824 from a propagated signal so that a device connected to a network environment 826 can send or receive voice, video or data, and to communicate over the network 826 using the instructions 824. The instructions 824 may further be transmitted or received over a network 826 via the network interface device 820.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A gateway, comprising:
a memory to store computer instructions; and
a processor coupled to the memory, wherein the processor, responsive to executing the computer instructions, performs operations comprising:
transmitting a first radio-frequency signal to a remote control device, wherein the first radio-frequency signal is received by a radio-frequency identification tag associated with the remote control device;
receiving at a plurality of receivers operably coupled to the gateway a plurality of second radio-frequency signals from the radio-frequency identification tag of the remote control device in response to transmitting the first radio-frequency signal, wherein the plurality of receivers are positioned at an area where the remote control device is expected to operate;
determining an approximate location of the remote control device based on a signal strength of the plurality of second radio-frequency signals received at the plurality of receivers; and
transmitting a signal to a set-top box, wherein the signal comprises the approximate location of the remote control device, and wherein the set-top box enables a display of the approximate location of the remote control device responsive to the signal.

2. The gateway of claim 1, wherein the determining of the approximate location of the remote control device is further based on a time delay between the transmitting of the first radio-frequency signal and the receiving of the plurality of the second radio frequency signals.

3. The gateway of claim 2, wherein the determining of the approximate location of the remote control device is further based on a triangulation analysis of the second radio-frequency signals received by the plurality of receivers.

4. The gateway of claim 1, wherein one of the plurality of receivers is positioned at the set-top box.

5. The gateway of claim 1, wherein the processor further performs operations comprising providing an interactive television services, wherein the interactive television services comprise one of internet protocol television, interactive satellite television, or interactive cable television.

6. The gateway of claim 1, wherein the radio-frequency identification tag comprises one of an active tag, a passive tag, or a semi-passive tag.

7. The gateway of claim 1, wherein the first radio-frequency signal is transmitted by a radio-frequency identification reader associated with the gateway.

8. A set-top box, comprising:
a memory to store computer instructions; and
a processor coupled to the memory, wherein the processor, responsive to executing the computer instructions, performs operations comprising:
receiving a radio-frequency signal from a radio-frequency identification tag associated with a remote control device, wherein the radio-frequency signal is generated by the remote control device in response to a transmitting of a first signal from the set-top box;
determining a location of the remote control device to generate a determined location based on a time delay between the transmitting of the first signal and the receiving of the radio-frequency signal; and
displaying the determined location of the remote control device via a graphical user interface that displays the location of the remote control device on a map of an area associated with the location of the remote control device.

9. The set-top box of claim 8, wherein the processor further performs operations comprising providing interactive television services, wherein the interactive television services comprise one of internet protocol television, interactive satellite television, or interactive cable television.

10. The set-top box of claim 8, wherein the processor further performs operations comprising receiving the radio-frequency signal from a gateway operably coupled to the set-top box.

11. The set-top box of claim 10, wherein the gateway receives the radio-frequency signal from the radio-frequency identification tag associated with the remote control device in response to the gateway being in a vicinity of the radio-frequency identification tag.

12. The set-top box of claim 8, wherein graphical user interface displays the determined location of the remote control device via an electronic programming guide.

13. The set-top box of claim 8, wherein the set-top box is operably coupled to a camera, wherein the camera takes a recording of an area associated with the determined location of the remote control device.

14. The set-top box of claim 13, wherein the processor further performs operations comprising displaying the recording of the area associated with the determined location of the remote control device.

15. The set-top box of claim 8, wherein the radio-frequency identification tag comprises one of an active tag, a passive tag, or a semi-passive tag.

16. A remote control, comprising:
a memory to store computer instructions; and
a processor coupled to the memory, wherein the processor, responsive to executing the computer instructions, performs operations comprising:
receiving a first radio-frequency signal from a gateway; and
transmitting a second radio-frequency signal to a plurality of receivers operably coupled to the gateway in response to receiving the first radio-frequency signal, wherein a first location of the remote control is determined by the gateway based on a signal strength of the second radio-frequency signal, wherein the first location is transmitted by the gateway to a set-top box operably coupled to the gateway, and wherein the first location is displayed by the set-top box via a graphical user interface.

17. The remote control of claim 16, wherein the remote control further comprises a radio-frequency identification tag.

18. The remote control of claim 17, wherein the radio-frequency identification tag receives the first radio-frequency signal and transmits the second radio-frequency signal to the plurality of receivers.

19. The remote control of claim 17, wherein the radio-frequency identification tag comprises one of an active tag, a passive tag, or a semi-passive tag.

20. The remote control of claim 16, wherein the first location of the remote control is further determined by the gateway based upon a time delay between the first radio-frequency signal from the gateway and the second radio-frequency signal from the remote control.

\* \* \* \* \*